United States Patent [19]

Harder

[11] Patent Number: 4,844,850
[45] Date of Patent: Jul. 4, 1989

[54] METHOD OF MAKING A DECORATIVE PANEL

[76] Inventor: James R. Harder, 2733 Brialane Blvd., Columbus, Ohio 43229

[21] Appl. No.: 689,460

[22] Filed: Jan. 7, 1985

[51] Int. Cl.$^4$ ............... B29C 39/12; B29C 59/02; B05D 3/12
[52] U.S. Cl. .......................... 264/129; 264/162; 264/246; 264/267; 427/275; 427/277; 427/291
[58] Field of Search ............... 264/129, 246, 162, 267; 427/291, 275, 277

[56] References Cited

U.S. PATENT DOCUMENTS

| 3,700,533 | 10/1972 | Schmitz | 428/46 |
| 4,411,855 | 10/1983 | Fiebig, Jr. et al. | 264/267 X |
| 4,486,371 | 12/1984 | Caliri | 264/162 X |

Primary Examiner—Evan Lawrence
Attorney, Agent, or Firm—Sidney W. Millard

[57] ABSTRACT

A method of making a decorative panel includes cutting an opening through a wooden panel and filling the hole with a colored hardenable resin. After the resin is hardened, it is sanded smooth with the wood surface and a finish coat is applied over the sanded surface.

14 Claims, 2 Drawing Sheets

METHOD OF MAKING A DECORATIVE PANEL

FIELD OF THE INVENTION

This invention involves a method of making decorative wall panels or wall plaques.

BACKGROUND OF THE INVENTION

Decoration for mounting on walls or as a part of walls goes back to the cave man. Mounting of plaques, photographs, paintings and the like on walls for pure decoration is conventional, however, the particular technique of this invention finds no true prior art.

The patent to Schmitz, U.S. Pat. No. 3,700,533 discloses a technique for forming a decorative panel where the resin employed to hold the wood portions of the panel in place extend the full depth of the panel. However, there is no real relationship with this invention.

SUMMARY OF THE INVENTION

Formation of a wall plaque according to this invention involves cutting a design in a wood panel and filling the cavity formed by the cutting with a colored resin to prevent the resin from flowing out the back side of the cavity, some sort of cover seals the down side of the cavity.

During the application of the resin in the cavity, the panel is placed on a horizontal surface such that the liquid resin will be retained in the cavity by gravity until the cavity is completely filled.

After the resin hardens, the panel is inverted and the down side cover is removed to expose the resin on what will be the front side of the panel. The front of the panel is sanded or planed smooth such that the panel and the resin in the opening presents a planar surface.

A finish layer of clear resin is applied to the front of the panel to protect the surface, seal the wood and bring out the color of the resin in the opening.

Objects of the invention will be clear from an observation of the drawings and a reading of the description of the preferred embodiment which follows.

DESCRIPTION OF THE PREFERRED EMBODIMENT

Figure 1:
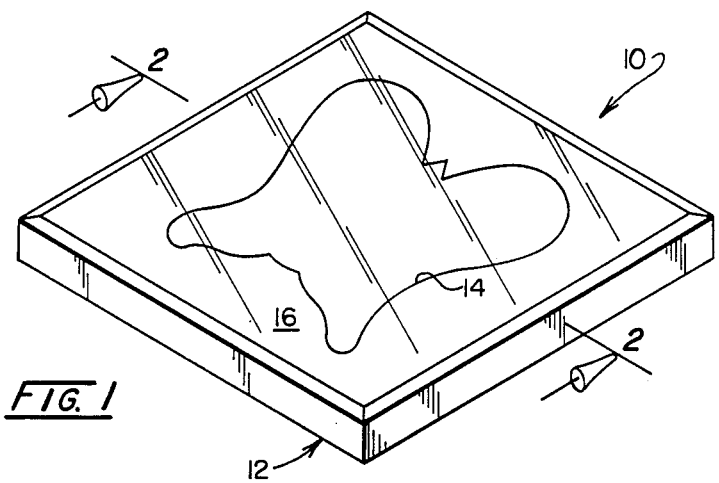
FIG. 1 is a perspective view of a decorative panel prepared according to the invention.
Figure 2:
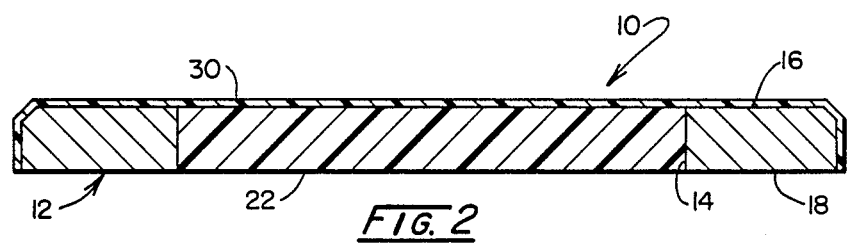
FIG. 2 is a sectional view taken along line 2—2 of FIG. 1.
Figure 3:
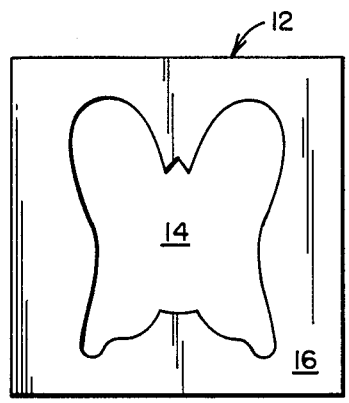
FIG. 3 is a top plan view of a panel having an opening cut therethrough.
Figure 4:
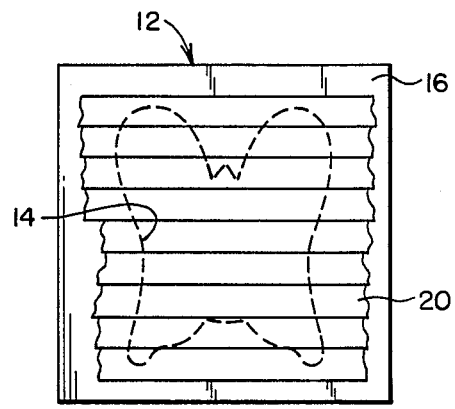
FIG. 4 is a top plan view of the panel of FIG. 3 with a covering over the opening.
Figure 5:
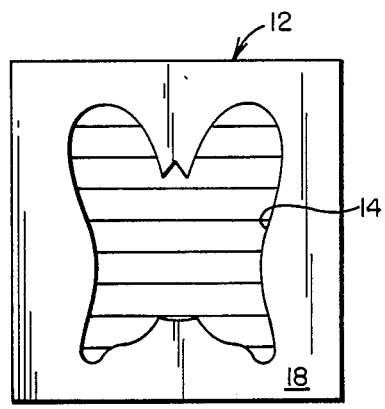
FIG. 5 is a bottom plan view of the panel of FIG. 3.
Figure 6:
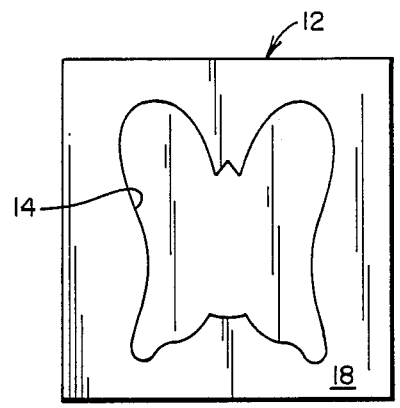
FIG. 6 is a plan view of FIG. 5 with the opening filled with a resin.

Looking to FIGS. 1 and 2, a decorative wall panel is formed by taking a wood panel 12 and cutting an opening 14 completely through from the front 16 to the back 18.

A wood panel 12 of any conventional size is satisfactory so long as it has a height, a width and a thickness. The thickness dimension is relatively immaterial. It is simply a requirement of this invention that the cavity or opening 14 extend completely through the panel for reasons which will be explained subsequently.

The means for forming or cutting the opening 14 in the panel is not critical. The preferred embodiment is to use a scroll saw. However, it is conceived that the design could be cut with a laser.

The particular design being formed is not material. The illustration in the drawings is of a butterfly. In some cases a clock can be formed having a central design with the hands of a clock projecting from the front and a battery operated clock mechanism mounted on the back; the numbers being simply cylindrical holes at the appropriate twelve locations around the periphery. Specifically, there is no limitation to the design which may conceivably be formed in the panel.

It is intended that the panel opening 14 be filled with a resin which will harden in place. Accordingly, it is necessary to seal one face of the panel to prevent the resin from flowing out of the opening. Two ways have been found to be satisfactory but other ways are certainly within the concept of the invention. One way to seal one face of the panel is to apply masking tape over one surface and another way is to apply a paper to the top of a table and then clamp the panel to the table such that the paper covers the area.

Regardless of what method is used the back side 18 of the panel should be facing upward when the panel 12 is oriented in horizontal fashion prior to the deposit of the liquid resin in the opening 14. The reason for this is that bubbles form in the resin regardless of how delicately the mixing and pouring is administered. It is not desirable to have bubbles in the face of the decorative panel. Accordingly, the face or front side 16 of the panel faces downward during the deposit of the resin so that the bubbles will rise to the surface which will be the back side 18 of the panel.

Figure 7:
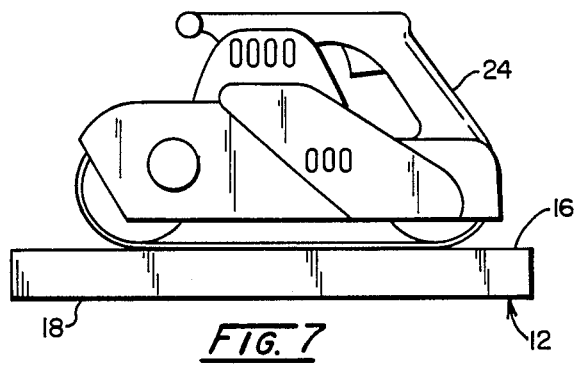
FIG. 7 is a side elevational view of the panel of FIG. 6 being sanded smooth.
Figure 8:
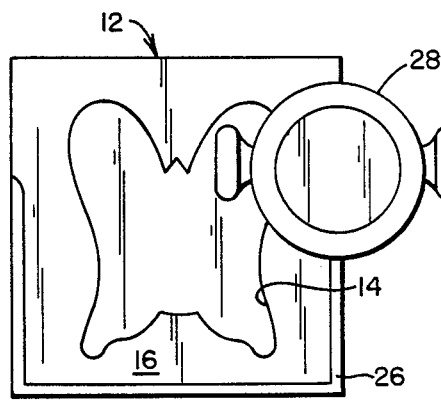
FIG. 8 is a top plan view of the panel of FIG. 3 having the resin filling the opening, the exposed surface sanded smooth and showing a router forming beveled or tapered edges on the panel.
Figure 9:
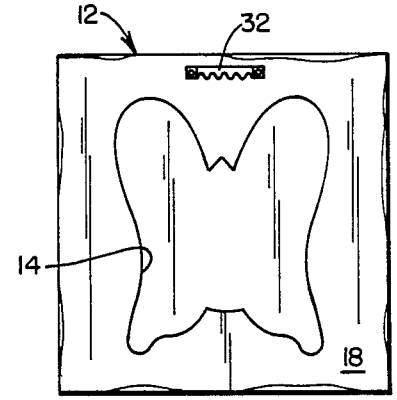
FIG. 9 is a view of the panel of FIG. 6 after a finish coat has been applied to the hidden side of the panel and a hanger attached to the facing surface of the panel.

After the resin is applied in the opening 14 it will be allowed to sit in stationary position for 24 to 48 hours to harden. After the hardening process is completed the panel will be inverted and the tape 20 will be stripped (or in the alternative, the paper cover removed) to expose the resin and the front side of the panel to a sanding operation by a belt sander 24 such as is illustrated in FIG. 7. Alternatively, a plane could be used to smooth the surface. The resins 22 preferred for this invention have the physical property of receiving the scoring during the sanding operation and giving the physical appearance of being a dull white in color and generally opaque. This physical characteristic exists because of the minute scratches caused by the sanding operation and the light reflecting from that sanded surface. In this invention it is desired that the color of the resin 22 be brought out as a part of the decorative characteristics and therefore after the sanding operation has been completed and any routing of the periphery of the panel such as is shown in FIG. 8 at 26 (and a router 28) has been completed, a clear layer of resin is applied to the front surface 16 of the panel. This clear layer 30, best seen in FIG. 2, has the interesting physical property of filling the minute grooves in the resin 22 caused by the sanding process and preventing the light from reflecting from those minute grooves. Thereby an observer will see through the clear layer 30 and perceive the true color of the underlying resin 22.

After resin 30 has been allowed to dry, if desired a hanging mechanism 32 may be applied to the back surface 18 of the panel.

The preferred resin for filling the cavity 14 is purchased from Chemco Resin Crafts, 6475 Sierra Lane, Dublin, CA 94568 and further details are set out below. It is possible to use a variety of pigments in the resin to get a plurality of desired colors for aesthetic purposes and they are also set out below:

| STOCK NO. | | ITEM | | | CHEMICAL |
|---|---|---|---|---|---|
| 00086 | | ULTRA-GLO EPOXY RESIN 4 GAL. IND. KIT | | | RESIN: Modified Diglycioyl Ether of Bisphenol A. HARDENER: Activated Heterocyclic/Aliphatic Amine (A Polyamine Curing Agent) |
| CARDED | UN-CARDED | OPAQUE PASTE PIGMENTS | | | VEHICLE BASE: POLYESTER ALKYD |
| 46302 | 45772 | RED | 1 OZ. | PIGMENT: | TOLUIDINE RED |
| 46280 | 45756 | BLUE | 1 OZ. | PIGMENT: | TITANIUM DI-OXIDE PHTHALO BLUE |
| 46345 | 45810 | WHITE | 1 OZ. | PIGMENT: | TITANIUM DI-OXIDE |
| 46299 | 45764 | BLACK | 1 OZ. | PIGMENT: | CARBON BLACK |
| 46310 | 45780 | ORANGE | 1 OZ. | PIGMENT: | LEAD-FREE ORANGE |
| 46337 | 45802 | YELLOW | 1 OZ. | PIGMENT: | LEAD-FREE YELLOW |
| 46353 | 45829 | BROWN | 1 OZ. | PIGMENT: | BURNT UMBER |
| 46329 | 45799 | GREEN | 1 OZ. | PIGMENT: | PHTHALO GREEN |

The desired chemical for forming the transparent layer 30 is the same resin and hardner identified above but without the pigment.

Having thus described the invention in its preferred embodiment it will be clear that modifications could be made in the process for forming the decorative wall plaque without departing from the spirit of the invention. It is not intended that the drawings nor the words used to describe them be limiting on the invention. Rather, it is intended that the invention be limited only by the scope of the appended claims.

I claim:

1. A process for making a decorative panel comprising, providing a three dimensional panel having both a height and width greater than its thickness, forming an opening through the full thickness of said panel, determining a front side and a back side for said panel, applying a cover to the front side of the panel and completely covering the opening, said cover having the physical characteristic of preventing resin from passing through said opening, inverting the panel and orienting the panel horizontally such that the back side of the panel faces upwardly, filling the opening with a hardenable resin having some color and allowing said resin to harden, removing the cover to expose the hardened resin at the front of the panel, smoothing the surface of the exposed resin on the front side to form a surface which appears to be white, and applying a transparent hardenable liquid finish layer to the front side of the panel following the smoothing step and allowing the layer to harden, wherein the physical characteristics of the transparent finish layer are such that it eliminates the white appearance and allows the true color of the resin to be observed from the front side of the panel.

2. The process of claim 1, further including adding a color to said resin and mixing the color and resin prior to filling the opening with the colored resin.

3. The process of claim 2 including smoothing both the front of the panel and the exposed resin to form them into a single planar surface prior to applying the transparent finish layer.

4. The process of claim 3 wherein the smoothing step includes sanding the front of the panel to the extent that the exposed resin surface appears as a white opaque surface.

5. The process of claim 4 wherein the panel is wood and the step of forming the opening includes a severing of the wood with a scroll saw.

6. The process of claim 5 including maintaining the panel at a temperature in the range 65°–100° F. during the resin hardening process.

7. The process of claim 6 comprising eliminating bubbles from the finish layer before it hardens.

8. The process of claim 2 wherein the smoothing step includes sanding the front of the panel to the extent that the exposed resin surface appears as a white opaque surface.

9. The process of claim 8 including maintaining the panel at a temperature in the range 65°–100° F. during the resin hardening process.

10. The process of claim 9 comprising eliminating bubbles from the finish layer before it hardens.

11. The process of claim 1 including smoothing both the front of the panel and the exposed resin to form them into a single planar surface prior to applying the transparent finish layer.

12. The process of claim 11 wherein the smoothing step includes sanding the front of the panel to the extent that the exposed resin surface appears as a white opaque surface.

13. The process of claim 12 including maintaining the panel at a temperature in the range 65°–100° F. during the resin hardening process.

14. The process of claim 13 comprising eliminating bubbles from the finish layer before it hardens.

* * * * *